United States Patent [19]

Hiraguri et al.

[11] Patent Number: 5,464,311
[45] Date of Patent: Nov. 7, 1995

[54] BLIND BOLT FOR ARCHITECTURE

[75] Inventors: Tokuo Hiraguri; Sohkichi Hiraguri, both of Nagano, Japan

[73] Assignee: Alps Seiko Co., Ltd., Nagano, Japan

[21] Appl. No.: 261,505

[22] Filed: Jun. 16, 1994

[30] Foreign Application Priority Data

Apr. 25, 1994 [JP] Japan .................................. 6-086294

[51] Int. Cl.6 .................................................. F16B 21/00
[52] U.S. Cl. ........................ 411/340; 411/345; 29/525.1
[58] Field of Search ............................ 411/340, 344, 411/345, 346, 75, 79, 80; 29/525.1

[56] References Cited

U.S. PATENT DOCUMENTS

| 867,799 | 10/1907 | Cook | 411/346 |
|---|---|---|---|
| 1,068,479 | 7/1913 | Brainard | 411/346 |
| 1,084,284 | 1/1914 | Merrill | 411/346 |
| 1,108,922 | 9/1914 | Menten | 411/346 |
| 1,516,242 | 11/1924 | Peirce | 411/346 |
| 2,504,325 | 4/1959 | Graver | 411/345 |
| 2,933,969 | 4/1960 | Huyssen | 411/345 |
| 4,283,986 | 8/1981 | Peterson et al. | 411/340 |
| 4,502,826 | 3/1985 | Fafard | 411/340 |
| 5,139,377 | 8/1992 | Reed | 411/340 |

FOREIGN PATENT DOCUMENTS

| 451965 | 10/1948 | Canada | 411/340 |
|---|---|---|---|
| 1240562 | 8/1960 | France | 411/346 |

*Primary Examiner*—Neill R. Wilson
*Attorney, Agent, or Firm*—Lowe, Price, Leblanc & Becker

[57] ABSTRACT

A blind bolt comprising a headed bolt with a male screw at the side opposite its head having an external diameter which can be inserted into through-holes of architecture members to be tightened; a rotating washer made of a cylindrical member having an external diameter which can be inserted into the through-holes of architecture members, and having on both end surfaces slopes in parallel to each other each of which has a longitudinal diameter larger than that of the internal diameter of each of said architecture members; and a nut which is screwed to the male screw. Thus, the blind bolt can be inserted into through-holes of architecture members from one side and also can be nut-tightened from the same one side thereby tightening the architecture members.

8 Claims, 6 Drawing Sheets

BLIND BOLT FOR ARCHITECTURE

BACKGROUND OF THE INVENTION

1. Field of the Invention

The present invention relates to a blind bolt for architecture which can be inserted into through-holes of architectural members from one side and nut-tightened from the same one side thereby to tighten the architecture members.

2. Description of the Prior Art

FIG. 9 shows a typical example to which nut-tightening is to be applied. As seen from FIG. 9, the upper flange 1a of an H-type steel 1 arranged in a horizontal direction has a through-hole 2. A floor plate 3 which is to be attached to the H-type steel 1 has a through-hole 4 overlapping through-hole 2. A headed bolt 5 penetrates through through-holes 2 and 4 to be tightened by a nut 6. Two workers are required for assembly, i.e. a worker who inserts the headed bolt 5 from the lower side of the H-type steel 1 and another worker who tightens the nut 6 from the floor plate 3.

The above conventional practice requiring two workers for bolt-nut tightening is manifestly disadvantageous in terms of increased expenses. In addition, the above conventional practice requires cooperative work in a situation in which the workers cannot see each other so that the work is inconvenient and very inefficient.

For this reason, the bolt 5 which was caused to penetrate through the through-holes 2 and 4 from one side was desired to be tightened using the nut 6 from the same one side. Until now, however, there has not been developed any suitable means for realizing that objective.

SUMMARY OF THE INVENTION

An object of the present invention is to solve the above problem by providing a blind bolt for architecture which permits bolt-penetration and nut-tightening from the same side by one worker.

The blind bolt of the present invention is not limited to the field of architecture, but can be applied to assembling any industrial machine and attaching its components.

In order to attain the above object, in accordance with of the one aspect of the present invention, there is provided a blind bolt for comprising: a headed bolt provided with a male screw at the side opposite to its head; a rotating washer made of a cylindrical member having an external diameter which can be inserted into through-holes of architecture members to be tightened, and having on both end surfaces slopes intersecting the center axis of said cylinder at a predetermined angle and being in parallel to each other, said headed bolt capable of penetrating through the rotating washer; and a nut which is screwed to the male screw, wherein the head of said headed bolt has an external diameter which can be inserted into through-hole of the architecture member, and the longitudinal diameter of an ellipse forming the contour of each of said .slopes is larger than the diameter of each of the through-holes of said architecture members.

In accordance with another aspect of the present invention, there is provided a blind bolt comprising: a headed bolt provided with a male screw at the side opposite to its head; a rotating washer made of a cylindrical member having an external diameter which can be inserted into through-holes of architecture members to be tightened, having on at least one end surface a slope intersecting the center axis of said cylindrical member at a predetermined angle and having a bolt insertion hole penetrating through the outer peripheral surface of said washer, said washer having a recess groove leading from said bolt insertion hole to said slope on one side of said peripheral surface and another recess leading from said bolt insertion hole to the other side of said peripheral surface; and a nut which is screwed to the male screw, wherein the head of said headed bolt has an external diameter which can be inserted into through-holes of the architecture members, and the length of said rotating washer is larger than the diameter of each of the through-holes of said architecture members.

In a blind bolt according to another aspect of the present invention, said rotating washer may have a larger weight at one side than at the other side with respect to said bolt insertion hole.

In operation, the blind bolt thus formed is completed in such a manner that after the headed bolt is penetrated through the rotating washer, a nut is screwed to the tip of the male screw of the headed bolt, and with the head turned downward, the head of the headed bolt is inserted into the through-holes of upper and lower architecture members to be tightened.

Then, the rotating washer is inserted into the through-holes in an upright state where the cylindrical member is substantially coincident with the center axis of the headed bolt.

The upright rotating washer abuts, in its tip of the slope, on the head of the headed bolt. The abutting point is displaced from the center of gravity of the rotating washer so that the weight of the rotating washer itself generates the rotating force at a fulcrum of the tip of the slope. Thus, when the washer has passed through the through-holes of architecture members, it falls down.

Therefore, in the rotating washer having slopes in parallel to each other, its lower slope is brought into contact with the head of the headed bolt. When the nut is tightened, the upper slope is brought into contact with the lower surface of the lower architecture member to tighten the architecture members by means of the rotating washer and nut.

In the rotating washer having a through-hole and a recess, the lower side of the peripheral surface of the fallen-down rotating washer is brought into contact with the head of the headed bolt. When the nut is tightened, the upper outer peripheral surface is brought into pressure-contact with the lower surface of the lower architecture member to tighten the architecture members by means of the rotating washer and nut.

Where one side of the rotating washer is made heavier than the other side thereof with respect to the bolt insertion hole, unbalance in the weight can generate a gravitational rotating force in the rotating washer.

The present invention has the following meritorious effects.

(1) Since the blind bolt for architecture is composed of fewer components, i.e., only a headed bolt, a rotating washer and a nut, its structure is simple. In addition, since the rotating washer can be formed of a pipe member by simple machining, the material cost and machining cost are low, and the entire blind bolt can be fabricated at a low cost.

(2) When the blind bolt is penetrated through the through-holes of e.g. architecture members from the one side of the through-holes, the rotating washer automatically rotates by about 90°. Therefore, the architecture members can be tightened by a simple operation of tightening the nut from one side of the through-holes. Thus, the cooperative work which required two workers as in conventional practices can be easily and efficiently performed by one worker.

(3) Where the blind bolt for architecture is used, a dedicated machining tool is not required.

(4) If the rotating washer is previously penetrated through the headed bolt and the nut is screwed to the bolt, the blind bolt will not be taken in pieces when it is transported to the spot where it is used. The bolt thus completed is not also bulky. This is convenient to its transportation.

The above and other objects and features of the present invention will be more apparent from the following description taken in conjunction with the accompanying drawings.

DESCRIPTION OF THE PREFERRED EMBODIMENTS

Figure 1:
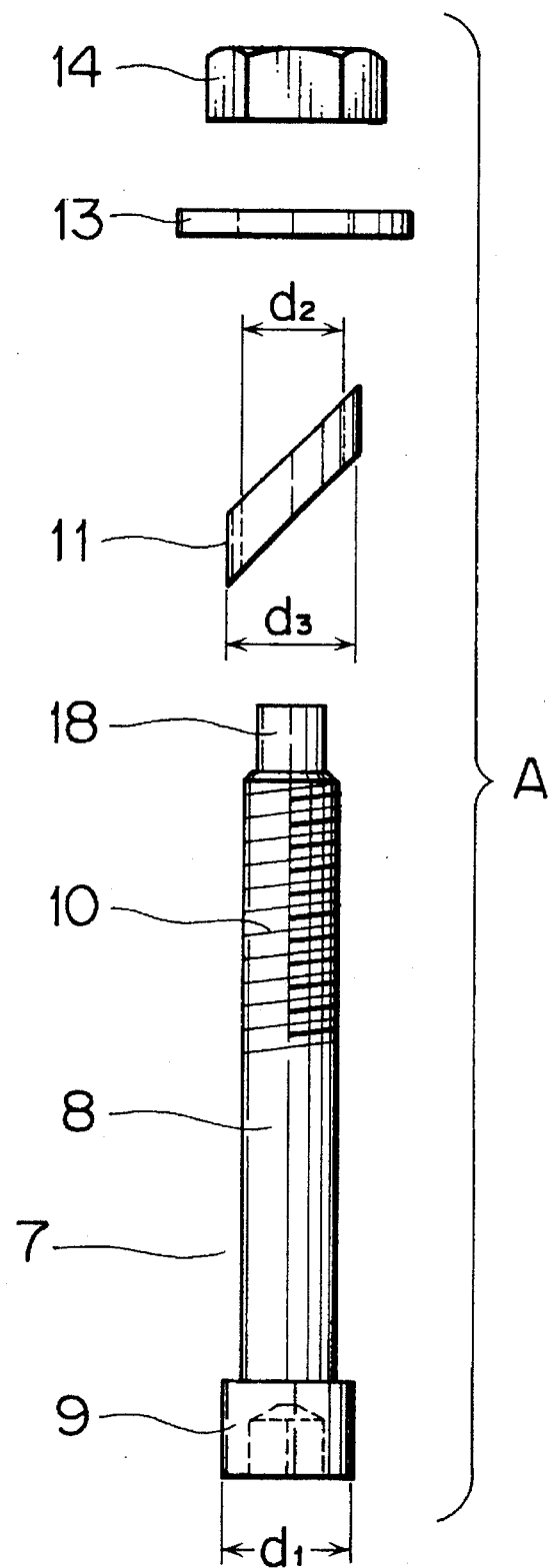
FIG. 1 is an exploded front view of the blind bolt A for architecture showing the first embodiment of the present invention.

Now referring to the drawings, an explanation will be given of the embodiments of the present invention.

Embodiment 1

FIG. 1 is a exploded front view of a blind bolt for architecture showing the first embodiment of the present invention.

As shown in FIG. 1, a headed bolt 7 is composed of a shaft portion 8, a head 9 provided at one end thereof and a male screw 10 formed on the side opposite to the head 9. In order that the headed bolt 7 can be easily tightened, a tool grasping portion 18 having a smaller diameter than that of the male screw 10 and a non-circular outer peripheral surface may be provided at the tip of the male screw 10. The head 9 has an outer diameter d1 which can penetrate through the through-holes 2 and 4 of architecture members.

Figure 3:
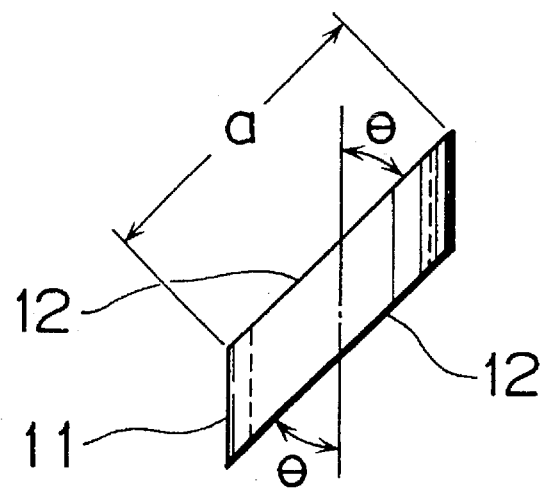
FIG. 3 is a front view of the rotating washer used in the blind bolt A for architecture.
Figure 4:
FIG. 4 is a side view of FIG. 3.

A rotating washer 11 which can be formed by cutting a cylindrical material has, on both end surfaces, slopes 12 each having a crossing angle θ for the center axis of a cylinder material and in parallel to each other (see FIG. 3). In this embodiment, the crossing angle θ is set for about 45 degree. The rotating washer 11 has an internal diameter d2 through which the shaft portion of the headed bolt 7 can pass and an outer diameter d3 which can penetrate through the holes 2 and 4 of architecture members (see FIG. 4).

The longitudinal diameter a the slope is made larger than the hole diameter of the holes 2 and 4 of the architecture members. A washer 13 is fit in the male screw 10 and a nut 14 is screwed to the male screw 10.

Now referring to FIGS. 2A to 2D, an explanation will be given of the operation of the blind bolt A thus constructed.

After the shaft portion 8 of the headed bolt 7 is penetrated through the rotating washer 11 and a washer 13, the nut 14 is screwed to the tip of the male screw 10. Thereafter, the headed bolt 7, with its head turned downward, is inserted into the through-holes 2 and 4 of the architecture members 1 and 3.

Then, since the rotating washer 11 is upright so that the center axis of the cylinder material is substantially coincident with that of the headed bolt 7, it can be inserted into the through-holes 2 and 4.

Figures 2A, 2B, 2C, 2D:
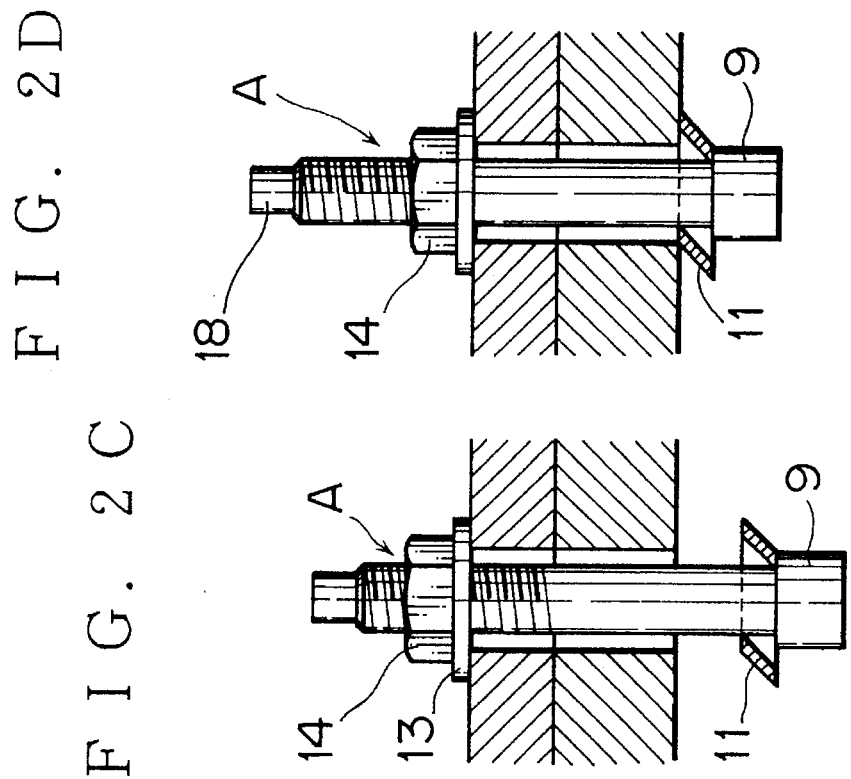
FIGS. 2A to 2D are views for explaining the operation of the blind bolt for architecture.

The nut 14 is previously screwed to the upper terminal of the male screw 10 so that penetration of the headed bolt 7 is not prevented (FIG. 2A).

The rotating washer 11 which is upright abuts, in the tip of its lower slope 12, on the head 9 of the headed bolt 7. Since the abutting point P is displaced from the center of gravity C of the rotating washer 11, the weight of the rotating washer 11 itself produces a rotation force in a clockwise direction at a fulcrum of the tip of the lower slope 12 (FIG. 2B). When the rotating washer 11 passes through the through-holes 2 and 4 of the architecture members 1 and 3, it automatically falls down (FIG. 2C). Then, the washer 13 prevents the headed bolt 7 from falling.

Thus, the rotating washer 11 having the slopes 12, 12 in parallel to each other abuts, in its lower surface 12, on the head 9 of the headed bolt 7. When the nut 14 is tightened, the upper slope 12 is brought into pressure-contact with the lower surface of the lower architecture member (H-type steel). Thus, the rotating washer 11 and nut 14 tightens the architecture members 1 and 3.

As the case may be, when the nut 14 is tightened, the headed bolt 7 may rotate simultaneously with the nut 14, thus resulting in shortage of tightening force. In this case, the simultaneous rotation can be prevented, with a tool grasping portion 18 grasped using a tool, by one hand by tightening the nut 14 using a spanner by the other hand.

The rotating washer 11, which has a large strength for compression weighing applied to both slopes 12, 12, can be efficiently applied to the case where a large tightening force is required.

This embodiment has advantages that the material expense and machining expense of the rotating member 11 are very low, and the blind bolt A for architecture can be easily used.

Embodiment 2

Figure 5:
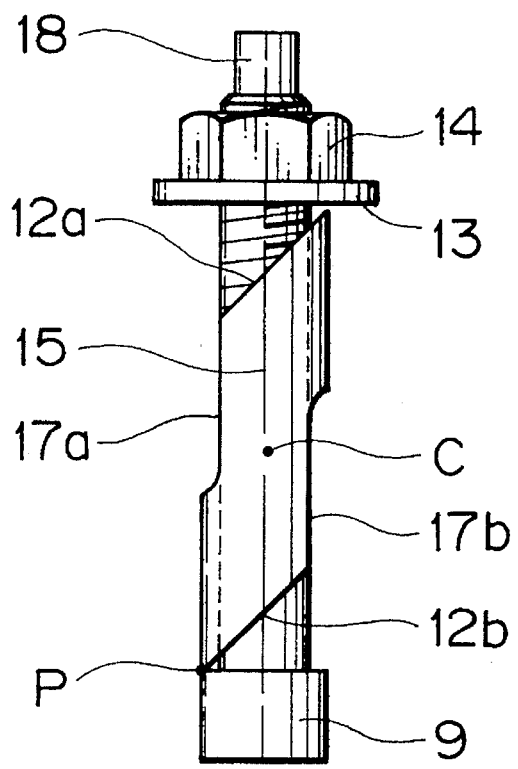
FIG. 5 is a front view of the blind bolt A1 for architecture showing the second embodiment of the present invention.
Figure 6:
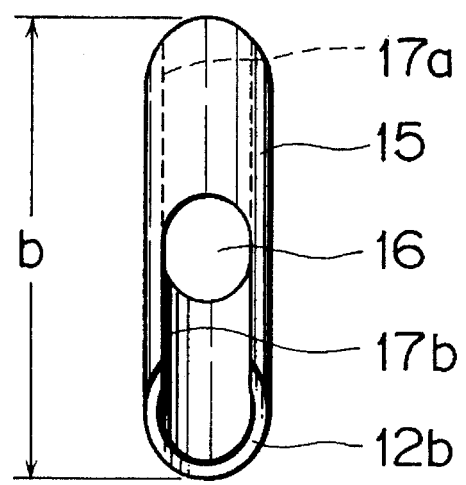
FIG. 6 is a side view of the rotating washer used in the blind bolt A1.

FIG. 5 is a front view of the blind bolt A1 in the second embodiment of the present invention. FIG. 6 is a side view of the rotating washer 15 used in the blind bolt A1 for architecture. The blind bolt A1 includes the same components as in the first embodiment except that it includes a rotating washer 15 in place of the rotating washer 11 in the first embodiment.

The rotating washer 15 can be prepared by machining a cylindrical material. The rotating washer (cylindrical material) 15 has an internal diameter through which the shaft portion of the headed bolt 7 can penetrate and an outer diameter which can penetrate through the holes 2 and 4 of architecture members 1 and 3. The rotating washer 15 has slopes 12a and 12b like the slopes 12 and 12 in the first embodiment. The length of the rotating washer 15 has a length b larger than the diameter of each of the through-holes of the architecture members 1 and 3 (see FIG. 6).

Further, the rotating washer 15 has a bolt insertion hole 16 which penetrates through its outer peripheral surface at the substantial central position of the washer.

On one side of the outer peripheral surface of the rotating washer 15, a recess groove 17a leading from the bolt insertion hole 16 to the one slope 12a is provided. On the other side of the outer peripheral surface, another recess groove 17b leading from the bolt insertion hole 16 to the other slope 12b is provided. The width of each of the recess grooves 17a and 17b is slightly larger than the diameter of the shaft portion 8 of the headed bolt 7.

The operation of the blind bolt A1 thus formed is the same as the blind bolt A according to the first embodiment. As shown in FIG. 5, since the point P where the tip of the lower slope 12b is in contact with the head 8 of the headed bolt 5 is located at the position displaced from the center C of gravity, the rotating washer 15 will rotate by 90° in a clockwise direction to fall down.

Since the length of the fallen-down rotating washer 15 is larger than the diameter of each of the holes 2 and 4, when the nut 14 is tightened, the architecture members will be tightened by means of the rotating washer 15 and nut 14.

The blind bolt A1 for architecture according to this embodiment, which may be broken owing to a relatively larger tightening force, can be applied to the case where a relatively small tightening force suffices.

Figure 7:
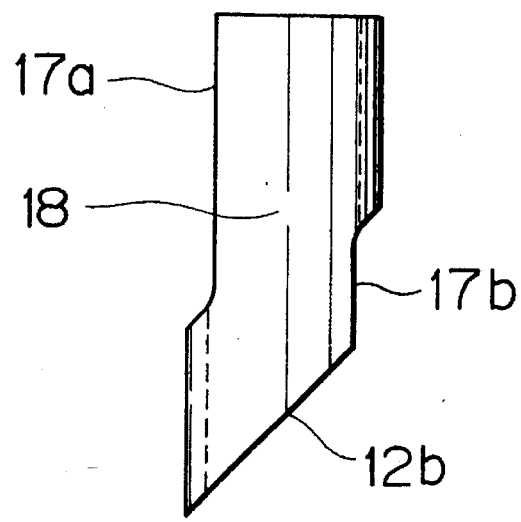
FIG. 7 is a side view of the rotating washer used in a modification of the second embodiment of the present invention.
Figure 8:
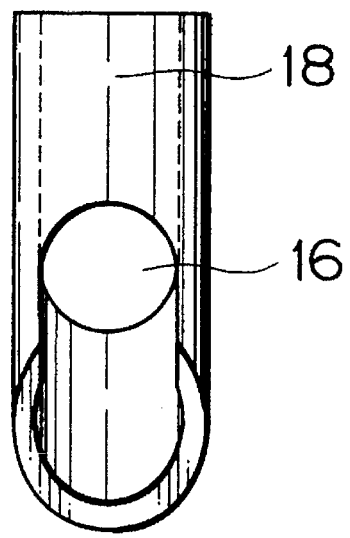
FIG. 8 is a side view of FIG. 7.
Figure 9:
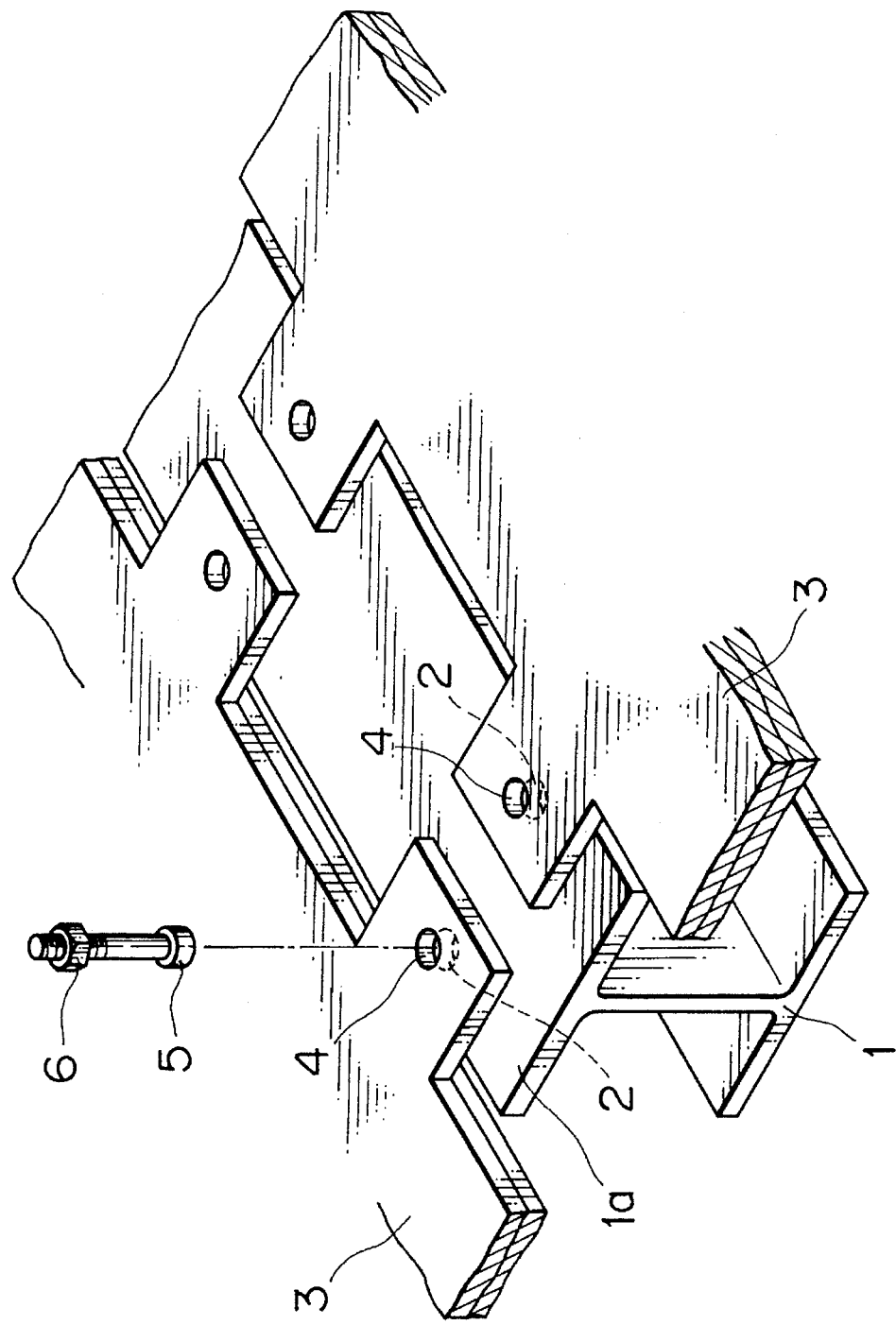
FIG. 9 is a perspective view showing one example of an arrangement relative to the through-holes of architecture members.

With reference to FIGS. 7 and 8, an explanation will be given of a modification of the blind bolt A1 according to the second embodiment. FIGS. 7 and 8 are a front view and a side view of the rotating washer 18 used in the blind bolt A1 according to this modification.

The rotating washer 18 is different from the rotating washer 15 according to the second embodiment in only that it has no slope on the one end surface.

The rotating washer 18, which has a larger weight on the one side (upper part in FIG. 7) than on the other side with respect to the bolt insertion hole 16, intends to increase the rotating force of the rotating washer 18 using unbalance in weight. In this modification, the slope 12b must be turned downward.

Such a rotating washer 18 which produces a rotating force due to unbalance in weight can be used in the transverse hole of an architecture member. Namely, when the headed bolt 7 is inserted into the transverse hole of an architecture member, the rotating washer 18 rotates by 90° owing to unbalance in weight. Therefore, the blind bolt according to this modification can be used as the blind bolt for a transverse hole.

We claim:

1. A blind bolt for architecture comprising:

a headed bolt comprising a male screw at the side opposite its head;

a rotating washer made of a cylindrical member having an external diameter which can be inserted into through-holes of architecture members to be assembled by tightening, and having on both end surfaces slopes intersecting the center axis of said cylindrical member at a predetermined angle sufficient to effect rotation of the rotating washer to a tightening position, said sloping surfaces being parallel to each other, said headed bolt penetrated through the rotating washer; and a nut screwed to the male screw, wherein the head of said headed bolt has an external diameter which can be inserted into through-holes of the architecture members, and the longitudinal diameter of an ellipse forming the contour of each of said slopes is larger than the diameter of each of the through-holes of said architecture members.

2. A blind bolt for architecture according to claim 1, wherein said predetermined angle is 45°.

3. A blind bolt for architecture according to claim 1, further comprising another washer located between said rotating washer and said nut.

4. A blind bolt for architecture comprising:

a headed bolt comprising a male screw at the side opposite its head;

a rotating washer made of a cylindrical member having an external diameter which can be inserted into through-holes of architecture members to be assembled by tightening, having on at least one end surface a slope intersecting the center axis of said cylindrical at a predetermined angle sufficient to effect rotation of the rotating washer to a tightening position, and having a bolt insertion hole penetrating through the outer peripheral surface of said washer, said washer having a recess groove leading from said bolt insertion hole to said slope on one side of said peripheral surface and another recess leading from said bolt insertion hole to the other side of said peripheral surface; and a nut which is screwed to the male screw, wherein the head of said headed bolt has an external diameter which can be inserted into through-holes of the architecture members, and the length of said rotating washer is larger than the diameter of each of the through-holes of said architecture member.

5. A blind bolt for architecture according to claim 4, wherein said rotating washer has a larger weight on one side than on the other side with respect to said bolt insertion hole.

6. A blind bolt for architecture according to claim 4, wherein said predetermined angle is 45°.

7. A blind bolt for architecture according to claim 4, further comprising another washer located between said rotating washer and said nut.

8. A method for assembling members comprising:

inserting a blind bolt into through-holes of the architectural members, said blind bolt comprising:

a headed bolt having a male screw at the side opposite its head;

a rotating washer made of a cylindrical member having an external diameter insertable in the through-holes, and having on both end surfaces slopes intersecting the center axis of said cylindrical member at a predetermined angle sufficient to effect rotation of the rotating washer to a tightening position, said sloping surfaces being parallel to each other, with the headed bolt penetrating through the rotating washer, the longitudinal diameter of an ellipse forming the contour of each of said slopes being greater than the diameter of the through-holes of said architectural members;

passing the headed bolt into the through-holes a sufficient distance so that the rotating washer passes completely through the through-holes and is caused to rotate to a tightening position by the parallel sloped surfaces;

screwing the nut onto the male screw; and tightening the nut to bring the architectural members into a tightened assembly, wherein one sloped surface is in pressure contact with a surface of an architectural member and the opposite sloped surface is in pressure contact with the head of the bolt.

* * * * *